United States Patent
Miyazaki et al.

(10) Patent No.: US 8,654,419 B2
(45) Date of Patent: Feb. 18, 2014

(54) IMAGE FORMING APPARATUS AND IMAGE DENSITY DETECTING METHOD

(75) Inventors: Susumu Miyazaki, Osaka (JP); Izumi Kinoshita, Hyogo (JP); Motohiro Kawanabe, Hyogo (JP); Takeshi Shikama, Osaka (JP); Takuhei Yokoyama, Osaka (JP); Tatsuya Miyadera, Osaka (JP)

(73) Assignee: Ricoh Company, Limited, Tokyo (JP)

( * ) Notice: Subject to any disclaimer, the term of this patent is extended or adjusted under 35 U.S.C. 154(b) by 162 days.

(21) Appl. No.: 13/415,082

(22) Filed: Mar. 8, 2012

(65) Prior Publication Data
US 2012/0229866 A1 Sep. 13, 2012

(30) Foreign Application Priority Data
Mar. 9, 2011 (JP) ................. 2011-051495

(51) Int. Cl.
*H04N 1/46* (2006.01)
(52) U.S. Cl.
USPC ............ 358/504; 358/1.9; 358/517; 358/518; 358/521; 347/15; 347/19; 347/41; 347/42; 347/116; 347/103; 347/232; 399/49; 399/72; 399/300; 399/301

(58) Field of Classification Search
None
See application file for complete search history.

(56) References Cited

U.S. PATENT DOCUMENTS

| | | | |
|---|---|---|---|
| 5,854,958 A * | 12/1998 | Tanimoto et al. ............... | 399/49 |
| 6,909,516 B1 * | 6/2005 | Hoover ........................ | 356/615 |
| 7,162,171 B2 * | 1/2007 | Sugiyama ..................... | 399/49 |
| 7,729,024 B2 * | 6/2010 | Kobayashi et al. ........... | 358/526 |
| 7,980,654 B2 * | 7/2011 | Mongeon et al. ............. | 347/19 |
| 8,009,320 B2 * | 8/2011 | Bae .............................. | 358/1.18 |
| 8,027,063 B2 * | 9/2011 | Maebashi ..................... | 358/3.26 |
| 8,125,695 B2 * | 2/2012 | Spears ......................... | 358/514 |
| 8,260,164 B2 * | 9/2012 | Masuda ........................ | 399/49 |
| 8,279,491 B2 * | 10/2012 | Ishibashi ..................... | 358/3.26 |
| 8,305,637 B2 * | 11/2012 | Shinohara ..................... | 358/1.9 |
| 8,320,024 B2 * | 11/2012 | Kawai et al. ................. | 358/3.26 |
| 8,405,879 B2 * | 3/2013 | Boness et al. ................ | 358/3.26 |
| 8,411,320 B2 * | 4/2013 | Takagaki et al. ............. | 358/1.9 |
| 2008/0069602 A1 * | 3/2008 | Miyadera ..................... | 399/301 |
| 2010/0008686 A1 * | 1/2010 | Masuda et al. ............... | 399/51 |
| 2010/0239331 A1 * | 9/2010 | Miyadera et al. ............ | 399/301 |
| 2011/0205560 A1 * | 8/2011 | Murayama .................... | 358/1.5 |
| 2012/0314232 A1 * | 12/2012 | Barkai et al. ................ | 358/1.9 |

FOREIGN PATENT DOCUMENTS

JP 2010-61069 3/2010

* cited by examiner

*Primary Examiner* — Dung Tran
(74) *Attorney, Agent, or Firm* — Oblon, Spivak, McClelland, Maier & Neustadt, L.L.P.

(57) ABSTRACT

An image forming apparatus performs pseudo gradation processing using dithering, and includes an image carrier; a plurality of light-emitting element arrays arranged in a main-scanning direction and including a plurality of light-emitting elements; an image forming unit performing lighting control of the arrays and forming a pattern image on the image carrier; a detecting unit detecting a density of the pattern image; a position detecting unit detecting a position in the main-scanning direction of the detecting unit with respect to the light-emitting element arrays; a determining unit that, based on the detected position, determines whether the detecting unit is positioned at a proper detection position with respect to the pattern image on which noise has no effect; and an operation control unit that, when the detecting unit is positioned at the proper detection position, performs an image density detection operation on the pattern image using the detecting unit.

9 Claims, 8 Drawing Sheets

IMAGE FORMING APPARATUS AND IMAGE DENSITY DETECTING METHOD

CROSS-REFERENCE TO RELATED APPLICATIONS

The present application claims priority to and incorporates by reference the entire contents of Japanese Patent Application No. 2011-051495 filed in Japan on Mar. 9, 2011.

BACKGROUND OF THE INVENTION

1. Field of the Invention

The present invention relates to an image forming apparatus and an image density detecting method.

2. Description of the Related Art

Typically, in an electrophotographic image forming apparatus, pseudo density gradation is expressed in binary data by implementing dithering.

While implementing dithering during image formation, in order to obtain the most suitable density gradation, a technology for adjusting the image density is known in which a plurality of differing dither patterns are formed and the image densities of those dither pattern images are detected by using an image density detection sensor. Then, the detection result is sent as a feedback to an image forming unit. According to the detection result, the image forming unit is controlled to perform image formation with the settings of that dither pattern which enables achieving the desired image density.

The abovementioned conventional technology is also implemented in an image forming apparatus in which a light-emitting diode (LED) array head including a plurality of LED arrays is used for the purpose of image formation. Usually, in the LED head array used for image formation, a plurality of LED arrays is aligned in the main-scanning direction. Each LED array includes a plurality of light-emitting elements. The LED arrays that are aligned in the LED array head form images on an image carrier, which performs relative movement in the sub-scanning direction on a line-by-line basis. While performing such image formation, problems may occur in the LED arrays that are arranged linearly and orthogonal to the sub-scanning direction of the image carrier. That is, misalignment may occur in the arrangement of the LED arrays thereby causing unevenness in that arrangement or misalignment may occur in the assembly of the LED arrays with respect to the LED array head. Such misalignment appears in the form of disturbance in the dither patterns, which are expected to be formed with regularity.

Hence, while adjusting the image density in the abovementioned manner, depending on the positioning of an image density detection sensor that detects the image density, the position at which disturbance occurs in a dither pattern may get detected by that sensor. Consequently, a noise image makes it difficult to properly detect the actual image density of the dither pattern.

Meanwhile, regarding dithering, Japanese Patent Application Laid-open No. 2010-061069 discloses a method by which the changes occurring in the image density due to skew correction can be corrected.

With the aim of preventing changes in the image density that occur in dither pattern images due to skew correction and with the aim of preventing the generation of stripe-shaped noise images that are formed periodically in the sub-scanning direction due to skew correction, Japanese Patent Application Laid-open No. 2010-061069 discloses a method in which correction is done based on image densities detected using pre-skew-correction dither patterns and post-skew-correction dither patterns and in which fine adjustment of image densities is done on a pixel-by-pixel basis.

However, the method disclosed in Japanese Patent Application Laid-open No. 2010-061069 is not intended for an image forming apparatus that includes light-emitting element arrays such as LED arrays. That is, in the light of the effects of stripe-shaped noise images formed due to misalignment of the light-emitting elements that occurs at the joining portions (joints) between the light-emitting element arrays, there is no way to properly detect the image densities of dither patterns. Thus, this issue remains unresolved.

There are problems occurring in an image forming apparatus that includes light-emitting element arrays such as LED arrays. Hence, there is a need to avoid the effects of stripe-shaped noise images formed due to misalignment of light-emitting elements such as LED arrays that occurs at the joining portions (joints) between the light-emitting element arrays, and to properly detect the image densities of dither patterns.

SUMMARY OF THE INVENTION

It is an object of the present invention to at least partially solve the problems in the conventional technology.

According to one embodiment, an image forming apparatus performs pseudo gradation processing by implementing dithering. The image forming apparatus includes an image carrier; a plurality of light-emitting element arrays that are arranged in the main-scanning direction and that include a plurality of light-emitting elements; an image forming unit that performs lighting control of the light-emitting element arrays and forms a pattern image on the image carrier; a detecting unit that detects the density of the pattern image; a position detecting unit that detects the position in the main-scanning direction of the detecting unit with respect to the light-emitting element arrays; a determining unit that, based on the detected position, determines whether or not the detecting unit is positioned at a proper detection position with respect to the pattern image on which a noise has no effect; and an operation control unit that, when the detecting unit is positioned at the proper detection position, performs an image density detection operation on the pattern image by making use of the detecting unit.

According to another embodiment, an image density detecting method is implemented in an image forming apparatus that performs pseudo gradation processing by implementing dithering. In the image density detecting method, lighting control is performed with respect to a plurality of light-emitting element arrays that are arranged in a main-scanning direction and a pattern image is formed on an image carrier; a density of the pattern image formed on the image carrier is detected by a detecting unit; a position in the main-scanning direction of the detecting unit is detected with respect to the light-emitting element arrays; it is determined, based on the detected position, whether or not the detecting unit is positioned at a proper detection position with respect to the pattern image on which a noise has no effect; and, when it is determined that the detecting unit is positioned at the proper detection position, an image density detection operation is performed with respect to the pattern image by making use of the detecting unit.

According to still another embodiment, a computer program product includes a non-transitory computer-usable medium having computer-readable program codes embodied in the medium for forming an image in an image forming apparatus that performs pseudo gradation processing by implementing dithering. The program codes when executed causes a computer to execute the method mentioned above.

BRIEF DESCRIPTION OF THE DRAWINGS

FIGS. 4A and 4B are diagrams illustrating a joining portion of two LEDAs 11a;

DETAILED DESCRIPTION OF THE PREFERRED EMBODIMENTS

Exemplary embodiments of an image forming apparatus are described below with reference to the accompanying drawings.

The embodiment relates to an image forming apparatus that includes light-emitting element arrays such as LED arrays. While performing pseudo gradation processing by means of dithering, the image processing apparatus checks whether or not the desired image density is achieved by actually generating dither pattern images and detecting the image densities of those images using an image density detecting unit.

In dither pattern images formed using the light-emitting element arrays, misalignment occurring in the sub-scanning direction at the joints between those images leads to the formation of stripe-shaped noise images (see explanation below with reference to FIGS. 5A and 5B). Unless the effect of such noise images is avoided, it is hard to properly detect the desired image density.

In that regard, the image forming apparatus according to the present embodiment detects the positions of image density detecting units with respect to light-emitting element arrays and determines whether or not the detected positions not affected by stripe-shaped noise images that are formed due to misalignment of the joints described above. Provided that the detected positions are determined to be proper detection positions that are not affected by the noise images, the image forming apparatus performs an image density detection operation with respect to dither pattern images.

Explained below in the embodiment is what is needed to be implemented to perform the image density detection operation.

Firstly, the explanation is given regarding a configuration of the image forming apparatus according to the present embodiment that includes an LED array head (sometimes also referred to as "LEDA head") in which plurality of LED arrays (sometimes also referred to as "LEDAs") are arranged. Thus, the LEDA head includes a plurality of LED arrays, which expose a photosensitive drum to light that is emitted by LEDs under the control based on image data regarding each color. The details regarding the LEDA head and the LEDAs are given later.

Herein, the explanation is given with reference to an image forming apparatus that includes LED arrays capable of forming full-color images. However, the explanation is also applicable to an image forming apparatus that includes, in place of the LEDAs, any type of light-emitting element arrays arranged in the manner illustrated in FIG. 3A (described later). Still alternatively, the explanation is also applicable to an image forming apparatus that does not form full-color images but forms monochromatic images.

Figure 1:
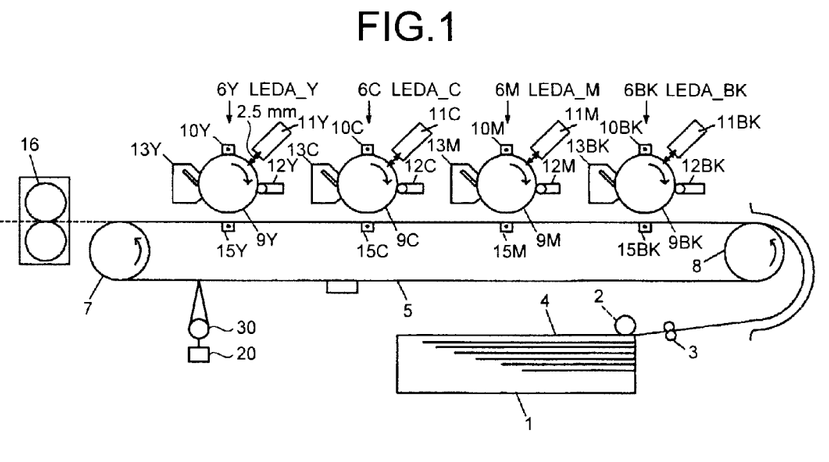
FIG. 1 is a diagram illustrating a configuration example of an image forming apparatus according to an embodiment.

FIG. 1 is a diagram illustrating a configuration example of the image forming apparatus according to the present embodiment.

The image forming apparatus illustrated in FIG. 1 forms images using electrophotographic technology. As illustrated in FIG. 1, in the image forming apparatus, image forming units 6BK, 6M, 6C, and 6Y corresponding to four colors are arranged along a carrier belt 5 that serves as an endless moving member. Thus, the image forming apparatus is, what is called, a tandem type image forming apparatus. That is, the image forming units 6BK, 6M, 6C, and 6Y are arranged in that order along the carrier belt 5 from the upstream side of the carrying direction of the carrier belt 5, which carries paper sheets (recording paper sheets) 4 that are fed one by one from a paper feeding tray 1 and separated by a feeding roller 2 and a separating roller 3.

Except for the color of images formed therein, the image forming units 6BK, 6M, 6C, and 6Y have the same internal configuration. The image forming unit 6BK forms images in black color; the image forming unit 6M forms images in magenta color; the image forming unit 6C forms images in cyan color; and the image forming unit 6Y forms images in yellow color. The following explanation is given specifically with reference to the image forming unit 6BK. Since the other image forming units 6M, 6C, and 6Y are identical to the image forming unit 6BK; the constituent elements of the image forming units 6M, 6C, and 6Y are illustrated in the diagrams by replacing the letters "BK" regarding the image forming unit 6BK with letters "M", "C", and "Y", respectively. Other than that, the same explanation is not repeated.

The carrier belt 5 is an endless belt wound around a driving roller 7, which is rotary-driven, and a driven roller 8. The driving roller 7 is rotary-driven by a drive motor (not illustrated). Thus, the driving roller 7 and the driven roller 8 function as a driving unit for moving the carrier belt 5, which is an endless moving member.

During image formation, the paper sheets 4 housed in the paper feeding tray 1 are fed one by one starting from the topmost paper sheet 4. Each paper sheet 4 gets adsorbed onto the carrier belt 5 by means of electrostatic adsorption. As the carrier belt 5 is rotary-driven, the paper sheet 4 is carried to the first image forming unit 6BK. Thereat, a black image is transferred onto the paper sheet 4. The image forming unit 6BK includes a photosensitive drum 9BK serving as a photosensitive member; and includes a charging device 10BK, an LEDA head 11BK, a developing device 12BK, a photosensitive drum cleaner (not illustrated), and a discharging device 13BK that are arranged around the photosensitive drum 9BK.

During image formation, the outer surface of the photosensitive drum 9BK is uniformly charged in the dark by the charging device 10BK and is then exposed to light emitted corresponding to a black image from the LEDA head 11BK. With that, an electrostatic latent image is formed on the outer surface of the photosensitive drum 9BK. The developing device 12BK develops that electrostatic latent image with a black toner so that a black image (toner image) gets formed on the outer surface of the photosensitive drum 9BK. At a transfer position at which the photosensitive drum 9BK makes contact with the paper sheet 4 being carried on the carrier belt 5, the black image is transferred onto the paper sheet 4 by the operation of a transfer unit 15BK. Thus, on the paper sheet 4 is formed a black toner image.

Once the image transfer is complete, the photosensitive drum cleaner cleans the residual toner on the outer surface of the photosensitive drum 9BK and the discharging device 13BK discharges the outer surface of the photosensitive drum 9BK. Thus, the photosensitive drum 9BK gets ready for the subsequent image formation.

Upon having the black image transferred thereon at the image forming unit 6BK, the paper sheet 4 is then carried by the carrier belt 5 to the next image forming unit 6M. Then, in an identical manner to the operations in the image forming unit 6BK, a magenta image is formed firstly on a photosensitive drum 9M of the image forming unit 6M and is then transferred onto the paper sheet 4. The magenta image is superimposed on the black image that is already present on the paper sheet 4.

Similarly, the paper sheet 4 is carried to the image forming units 6C and 6Y. A cyan image formed on a photosensitive drum 9C of the image forming unit 6C and a yellow image formed on a photosensitive drum 9Y of the image forming unit 6Y are transferred onto the paper sheet 4, and superimposed on the image that is already present on the paper sheet 4.

As a result, a full-color image is formed on the paper sheet 4. Then, the paper sheet 4 is detached from the carrier belt 5 before a fixing device 16 fixes the full-color image to the paper sheet 4. Lastly, the paper sheet 4 is discharged to the outside of the image forming apparatus.

Figure 2:
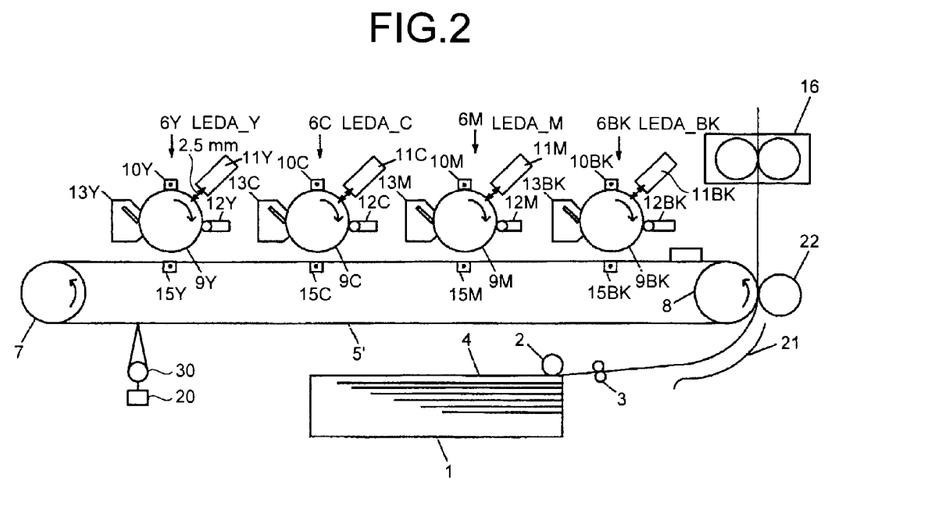
FIG. 2 is a diagram illustrating another configuration example of the image forming apparatus according to the embodiment.

FIG. 2 is a diagram illustrating another configuration example of the image forming apparatus according to the present embodiment. Instead of implementing the direct transfer configuration illustrated in FIG. 1, that is, instead of a configuration in which images on the photosensitive drums are transferred directly onto the paper sheet 4; the image forming apparatus illustrated in FIG. 2 has a configuration in which images are transferred onto the paper sheet 4 via an intermediate transfer mechanism. Apart from the intermediate transfer mechanism, the image forming apparatus is essentially identical to the configuration illustrated in FIG. 1. Hence, the following explanation is given only regarding the differences among the two configurations.

In the image forming apparatus illustrated in FIG. 2, the carrier belt 5 disposed in the direct-transfer-type image forming apparatus illustrated in FIG. 1 is replaced by an intermediate transfer belt 5' as the endless moving member.

The intermediate transfer belt 5' is also an endless belt wound around the driving roller 7 and the driven roller 8.

At positions at which the photosensitive drums 9BK, 9M, 9C, and 9Y respectively make contact with the intermediate transfer belt 5' (i.e., at primary transfer positions), the transfer units 15BK, 15M, 15C, and 15Y transfer the images of respective colors onto the intermediate transfer belt 5'.

As a result, the four images of different toner colors are superimposed on the intermediate transfer belt 5' thereby resulting in the formation of a full-color image.

The paper sheets 4 housed in the paper feeding tray 1 are fed one by one starting from the topmost paper sheet 4, and each paper sheet 4 is carried by the intermediate transfer belt 5'. At the position at which the paper sheet 4 that has been fed makes contact with the intermediate transfer belt 5' (i.e., at a secondary transfer position 21), the full-color image is transferred onto the paper sheet 4. At the secondary transfer position 21 is disposed a secondary transfer roller 22 that presses the paper sheet 4 against the intermediate transfer belt 5' so as to enhance the transfer efficiency. The secondary transfer roller 22 is attached firmly to the intermediate transfer belt 5', and no attaching-detaching mechanism is provided.

The secondary transfer of the full-color image is followed by fixing of that image. Then, the paper sheet 4 is discharged to the outside of the image forming apparatus.

Meanwhile, apart from the normal print output operation in which an image is transferred onto the paper sheet 4 before outputting the paper sheet 4, the image forming apparatus illustrated in FIG. 1 as well as in FIG. 2 also performs a separate operation of forming an adjustment pattern image for the purpose of adjusting image output conditions such as image densities or position shifts in images.

While performing the adjustments, an adjustment pattern image is often not output on the paper sheet 4. Instead, an adjustment pattern image that is formed under predetermined output conditions is formed on a transfer belt, and the output result is evaluated by means of optical detection of that image.

According to the present embodiment, in the image forming apparatus illustrated in FIG. 1, the carrier belt 5 that carries the paper sheets 4 is made to double up as a transfer belt and an adjustment pattern image is transferred thereon. In the image forming apparatus illustrated in FIG. 2, an adjustment pattern image is transferred on the intermediate transfer belt 5' having the usual configuration. The pattern image formed on any one of the two transfer belts is detected by an image density detection sensor 30. Herein, the image density detection sensor 30 is an optical sensor that includes a light receiving element, which emits light on the transfer belt before receiving the reflected light.

In the image forming apparatus illustrated in FIG. 1 as well as in FIG. 2, the image density detection sensor 30 is installed to optically detect the adjustment pattern image. Meanwhile, the image density detection sensor 30 may be installed separately for each adjustment pattern regarding image densities or position shifts in images, or may be installed in common for all adjustment patterns.

Moreover, in the present embodiment, as one of the operations for checking output conditions, image density detection sensors such as the image density detection sensors 30 detect image densities of dither pattern images. Prior to such detection of image densities, position detection patterns (described later) are formed that point to the patterns used in detecting the positions of the image density detection sensors with respect to the LEDAs. Then, the image density detection sensors are used to detect the position detection patterns too.

Meanwhile, a movement mechanism 20 is disposed, which includes a drive motor and a support member that supports the image density detection sensor 30. The movement mechanism 20 enables the movement of the image density detection sensor 30 in the main-scanning direction.

The following explanation is given regarding a configuration of an LEDA head, which is disposed in each the image forming units 6BK, 6M, 6C, and 6Y in the image forming apparatus (illustrated in FIG. 1 as well as in FIG. 2), and regarding the relationship between the LEDA head and image density detection sensors.

Figure 3A:
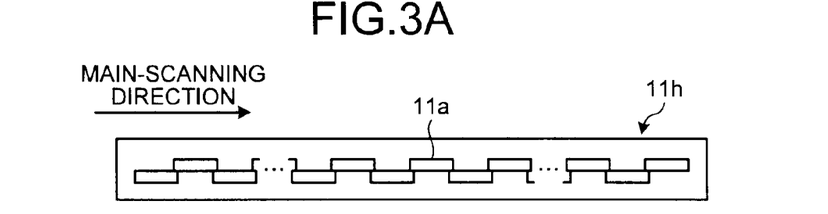
FIGS. 3A to 3C are explanatory diagrams for explaining a configuration example of image density detection sensors arranged in a predetermined manner in an LEDA head used in the image forming apparatus according to the embodiment.
Figure 3B:
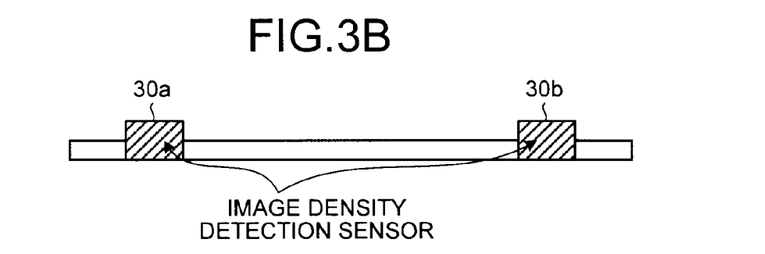
Figure 3C:
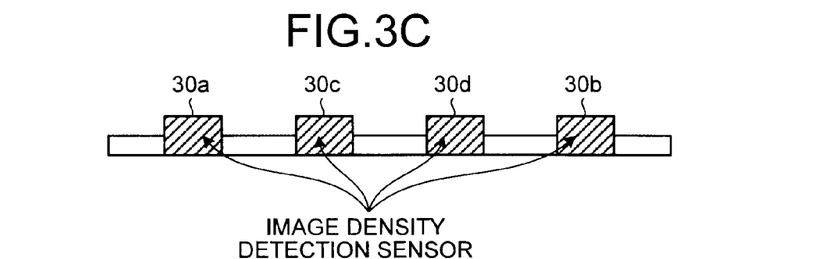

FIGS. 3A to 3C are explanatory diagrams for explaining a configuration example of image density detection sensors arranged in a predetermined manner in an LEDA head used in the image forming apparatus according to the present embodiment.

FIG. 3A illustrates an LEDA head 11h that includes a plurality of LEDAs 11a arranged in the main-scanning direction (indicated by an arrow). In this example, it is assumed that 30 LEDAs 11a are arranged over a length of 210 mm, which is equivalent to the lateral length of the A4 size. Meanwhile, in FIG. 3A, of the 30 LEDAs 11a, some LEDAs 11a in the middle portion are not illustrated.

As illustrated in FIG. 3A, the 30 LEDAs 11a are assembled in the LEDA head 11h in such a manner that each LEDA 11a is joined to the adjacent LEDA 11a with some portion thereof overlapping each other. Thus, during the manufacturing process of the LEDA head 11h in which the 30 LEDAs are assembled, there is a possibility that misalignment in the arrangement of light-emitting elements occurs at the joining portions (joints) of the LEDAs 11a.

Figure 4A:
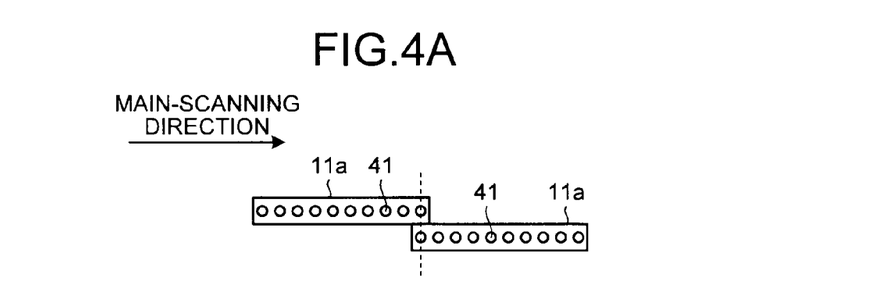
Figure 4B:
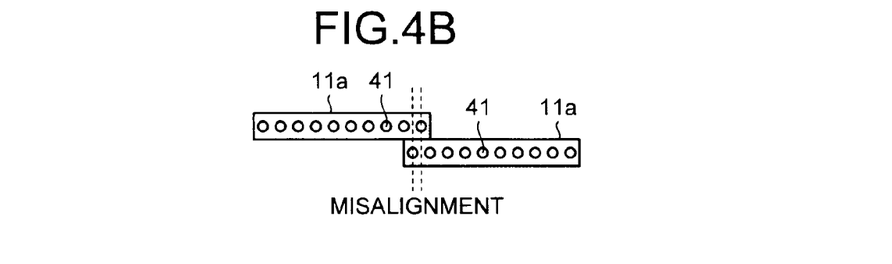

FIGS. 4A and 4B are diagrams illustrating a joining portion of two LEDAs 11a. FIG. 4A illustrates a case when two adjacent LEDAs 11a are joined normally, while FIG. 4B illustrates a case when the joining portion between two adjacent LEDAs 11a is misaligned. In FIGS. 4A and 4B, it is illustrated that a plurality of light-emitting elements 41 is disposed inside each LEDA 11a.

As illustrated in FIG. 4A, when two adjacent LEDAs 11a are joined normally, the light-emitting elements 41 within the joining portion (i.e., the overlapping portion) of those two LEDAs 11a are aligned in the sub-scanning direction. Hence, when writing is performed by making those two light-emitting elements 41 to emit a laser light, the pixels that get written are not misaligned. Thus, the dither pattern image that is formed does not get disturbed in a major way.

However, as illustrated in FIG. 4B, when the joining portion (i.e., the overlapping portion) between two adjacent LEDAs 11a is misaligned, the light-emitting elements 41 within the joining portion (i.e., the overlapping portion) of those two LEDAs 11a are also arranged out of alignment in the sub-scanning direction. Hence, when writing is performed by making those two light-emitting elements 41 to emit a laser light, the pixels that get written are also misaligned. As a result, the dither pattern image that is formed happens to include a stripe-shaped noise image (see explanation below with reference to FIGS. 5A and 5B).

FIG. 3B illustrates an arrangement of image density detection sensors 30a and 30b, which detect image densities of the images formed by the LEDA head 11h, in the main-scanning direction of the LEDA head 11h. The image density detection sensors 30a and 30b correspond to the image density detection sensor 30 disposed on the carrier belt in the image forming apparatus illustrated in FIG. 1 or on the intermediate transfer belt 5' illustrated in FIG. 2. Thus, the image density detection sensors 30a and 30b are arranged in a predetermined manner in the width direction (in the main-scanning direction) of the carrier belt 5 or the intermediate transfer belt 5'.

In the example illustrated in FIG. 3B, two image density detection sensors 30a and 30b are installed. This arrangement indicates that, while detecting a skew amount, two image density detection sensors 30a and 30b are required and used as the sensors for detecting predetermined pattern images that are formed for the detection purpose.

FIG. 3C illustrates an arrangement example in which the image density detection sensors 30a and 30b illustrated in FIG. 3B are accompanied by two more image density detection sensors 30c and 30d. Thus, a total of four image density detection sensors 30a, 30b, 30c, and 30d are arranged in the main-scanning direction.

When these four image density detection sensors 30a, 30b, 30c, and 30d are used in the image density detection operation (described later) performed with respect to dither pattern images, at least one of those four sensors is selected as the sensor positioned at a proper detection position.

Meanwhile, even when the aim is to simply detect a plurality of types of dither pattern image densities in a short period of time, a plurality of image density detection sensors can be arranged as illustrated in FIG. 3B or FIG. 3C. Moreover, the arrangement of four image density detection sensors illustrated in FIG. 3C can be used not only to detect the skew amount but also to detect position shifts in images in the main-scanning direction/the sub-scanning direction.

Explained below is a situation in which, while detecting image densities as an output condition of various dither patterns, the arrangement of the image density detection sensors makes it difficult to perform proper detection. Also explained is the solution to perform proper detection.

As described above, when dither pattern images are formed using the LEDA head, stripe-shaped noise images are also formed. Thus, firstly, the explanation is given regarding the cause-effect relationship between the stripe-shaped noise images and the misalignment that occurs in the sub-scanning direction at the joining portions of images, which are formed by the LEDAs 11a constituting the LEDA head 11h, and that is responsible for the stripe-shaped noise images.

Figure 5A:
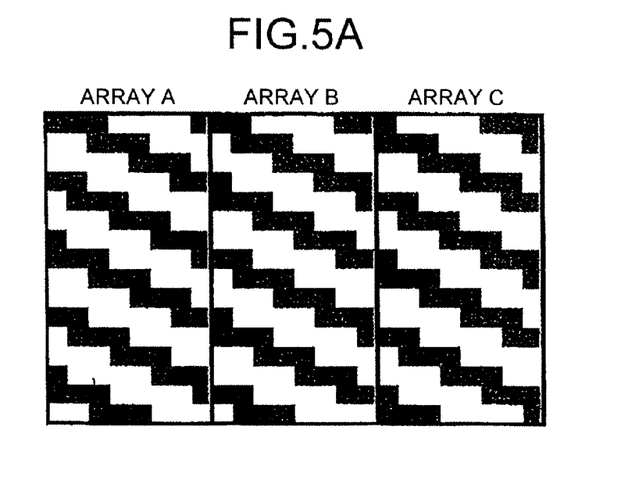
FIGS. 5A and 5B are explanatory diagrams for explaining a situation when a stripe-shaped noise image is formed in dither pattern images.
Figure 5B:
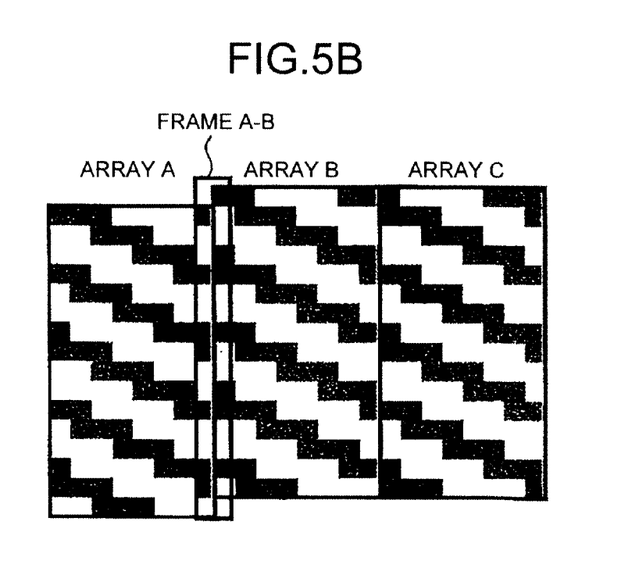

FIGS. 5A and 5B is an explanatory diagram for explaining a situation when a stripe-shaped noise image is formed in dither pattern images.

FIG. 5A illustrates trimmed portions of dither patterns that are formed by arrays A, B, and C that are the three LEDAs 11a arranged in the main-scanning direction of the LEDA head 11h. The dither patterns illustrated in FIG. 5A are patterns in a normal condition when there is no misalignment in the sub-scanning direction at the joining portions of the images formed by the arrays A, B, and C.

Similarly, FIG. 5B also illustrates trimmed portions of dither patterns that are formed by the arrays A, B, and C that are the three LEDAs 11a in the main-scanning direction of the LEDA head 11h. However, of the three arrays illustrated in FIG. 5B, at the time of assembling the array A in the sub-scanning direction, there occurs a position shift at the array A. Hence, the joining portion of the images formed by the arrays A and B is not in alignment. Meanwhile, as far as the misalignment occurring at the joining portions of images formed by the LEDAs 11a is concerned, it may not only occur due to the misalignment among the LEDAs 11a during the manufacturing process of the LEDA head 11h but also occur due to the misalignment at the joining portions of images that are formed by performing skew correction (described later).

FIG. 5A illustrates a case when there is no misalignment, which may occur during the manufacturing process, in the sub-scanning direction at the joining portions of LEDAs and when skew correction is not performed. Thus, in this case, there is no misalignment in the sub-scanning direction at the joining portions of images formed by the LEDAs 11a, and the condition is normal with a uniform arrangement of dots. As a result, an intended dither pattern (A) is formed.

However, when misalignment occurs in the sub-scanning direction at the joining portions of LEDAs during the manufacturing process or when skew correction is performed; then, as illustrated in FIG. 5B, misalignment occurs in the sub-scanning direction at the joining portions of images formed by the LEDAs 11a (in FIG. 5B, the portion enclosed by a frame A-B), and the arrangement of dots also goes out of alignment. Such misalignment appears in the form of a stripe-shaped noise image in the dither pattern image. That is, in that particular portion, the image density is different than the image density of the original dither pattern. Thus, that particular portion indicates an abnormal image density.

If the image density of that portion is detected as the image density of the dither pattern to be subjected to image density detection, then an incorrect detection result is obtained.

In that regard, in the present embodiment, the following method is implemented so as to properly detect the image density of the dither patterns while avoiding the effect of stripe-shaped noise images formed in the abovementioned manner.

In this method, as described above, the attention is focused on the point that a noise image is generated at a joining portion of the images formed by LEDAs. Basically, it is ensured that the operation for detecting the image density of a dither pattern is performed at a position that is not in the vicinity of the joining portion where the noise image affects the image density detection sensor. The details of this method are explained along with the explanation of a functional configuration of the image forming apparatus according to the present embodiment.

Figure 6:
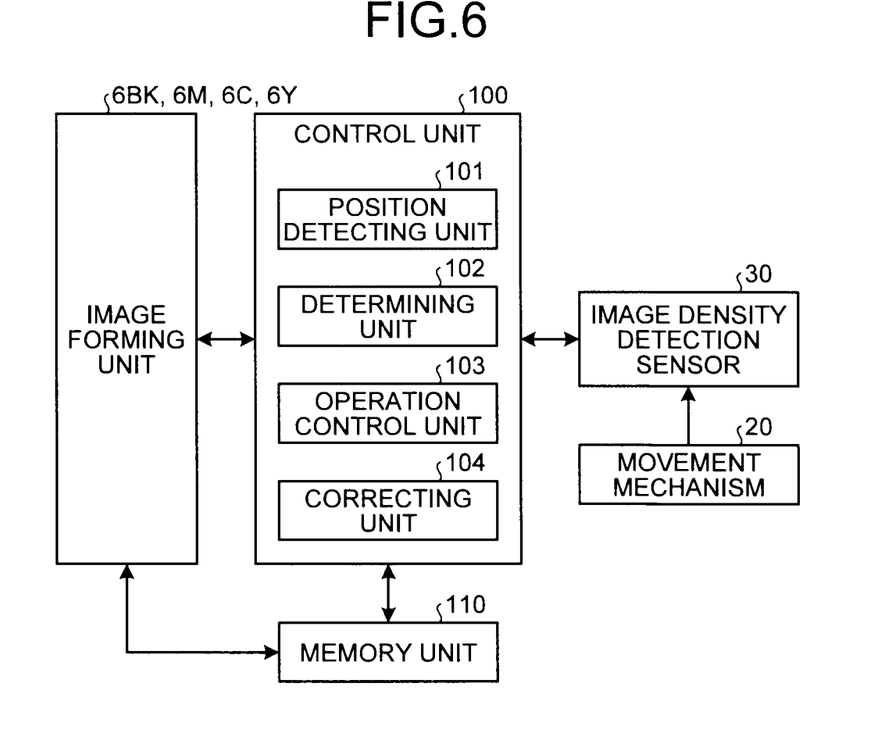
FIG. 6 is a block diagram of a functional configuration of the image forming apparatus according to the embodiment.

FIG. 6 is a block diagram of a functional configuration of the image forming apparatus according to the present embodiment. As illustrated in FIG. 6, the image forming apparatus according to the present embodiment mainly includes the abovementioned image forming units 6BK, 6M, 6C, and 6Y; the abovementioned image density detection sensor 30; the abovementioned movement mechanism 20; a control unit 100; and a memory unit 110.

The memory unit 110 records therein image data of position detection patterns and provides that image data to the image forming units 6BK, 6M, 6C, and 6Y.

The image forming units 6BK, 6M, 6C, and 6Y perform image formation under the control of the control unit 100. In the present embodiment, the image forming units 6BK, 6M, 6C, and 6Y receive input of image data generated by the control unit 100 for the purpose of image formation and receive input of control data generated by the control unit 100, and accordingly perform necessary operations for image formation such as driving of the LEDA head.

The image density detection sensor 30 performs operations that enable the image density detection operation. The image density detection sensor 30 detects detection data via the control unit 100 and an interface (I/F), and sends and receives necessary data for the control performed on the sensor side such as the control of an embedded light source for detection.

The control unit 100 is mounted on a controller board, and mainly includes a position detecting unit 101, a determining unit 102, an operation control unit 103, and a correcting unit 104.

In the present embodiment, detection is performed regarding the positional relationships between the positions of the image density detection sensors 30 and the positions of the joining portions of images that are formed by LEDAs. Then, it is determined whether or not the detection amount that represents a positional relationship indicates a proper detection position, that is, whether or not the detection amount indicates a position that is within a predetermined range but not in the vicinity of a joining portion (joint).

In the present embodiment, a method described below is put into effect for the purpose of detecting the position of the image density detection sensors 30 with respect to the positions of the joining portions of images that are formed by LEDAs. More particularly, the image forming units 6BK, 6M, 6C, and 6Y actually form position detection patterns regarding the LEDAs under consideration on the carrier belt 5 or the intermediate transfer belt 5'. Then, the image density detection sensors 30 detect the images of those position detection patterns. According to the detection result, the detection amount indicating the intended position is obtained.

Figure 7:
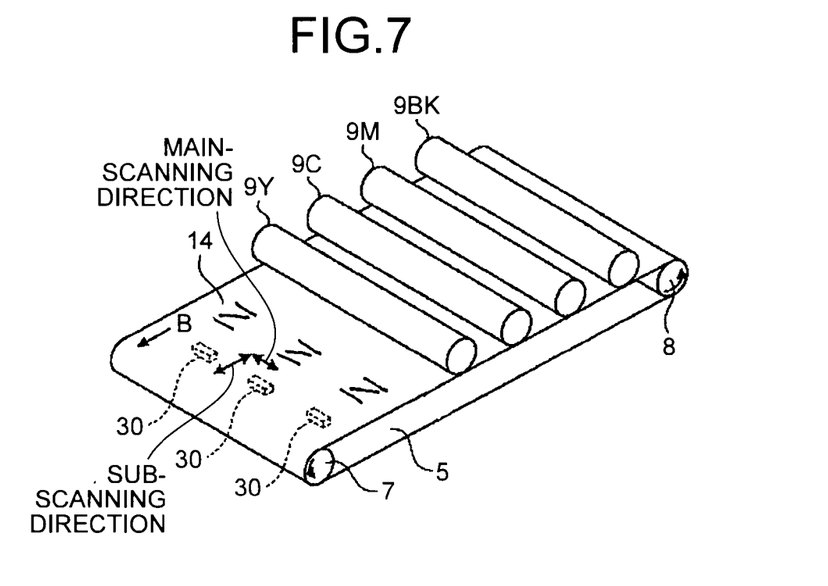
FIG. 7 is a perspective view of the general outline of a configuration surrounding an intermediate transfer belt in the image forming apparatus according to the embodiment.

FIG. 7 is a perspective view of the general outline of the configuration surrounding the intermediate transfer belt in the image forming apparatus according to the present embodiment. In FIG. 7, the same constituent elements as illustrated in FIG. 1 are referred to by the same reference numerals and the explanation thereof is not repeated. In FIG. 7, position detection patterns 14 are formed on the intermediate transfer belt 5 in an identical manner to the operation of forming toner images of four colors. Herein, the same position detection pattern 14 is formed thrice in the perpendicular direction to the driving direction of the intermediate transfer belt 5 (illustrated by an arrow B in FIG. 7). Meanwhile, the number of position detection patterns that are formed is not limited to three. On the underside of the intermediate transfer belt 5', three image density detection sensors 30 are arranged for reading the position detection patterns 14 in a corresponding manner to the positions of the position detection pattern 14.

Figure 8:
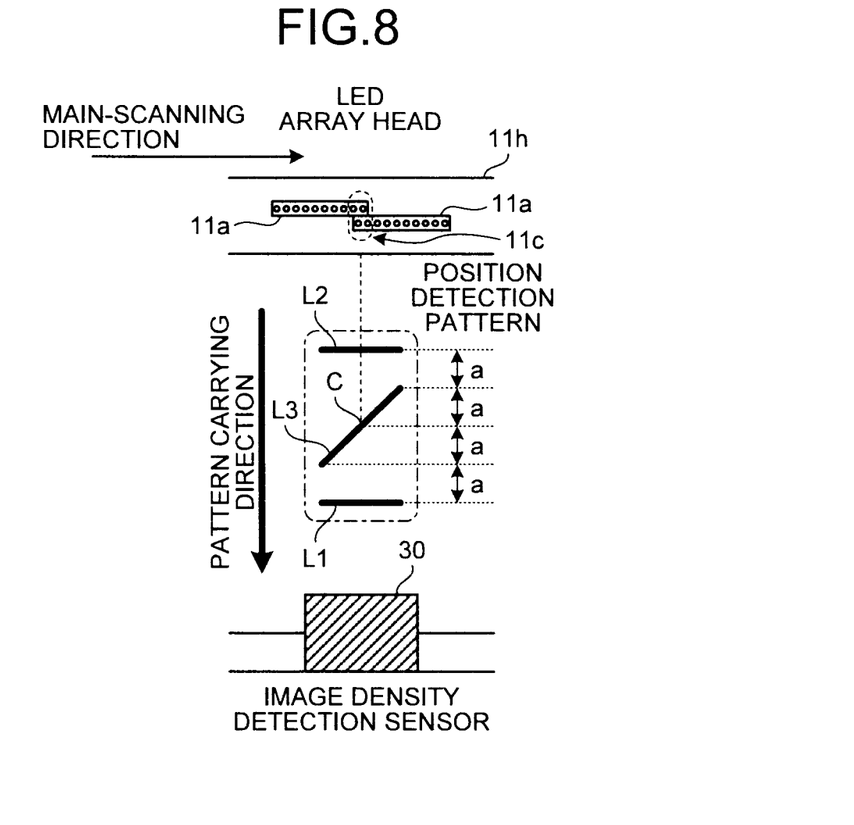
FIG. 8 is an explanatory diagram for explaining a position detection operation in which position detection patterns are used for detecting the positions of image density detection sensors with respect to the positions of joining portions of images formed by LEDAs.

FIG. 8 is an explanatory diagram for explaining a position detection operation according to the present embodiment in which the position detection patterns 14 are used for detecting the positions of image density detection sensors with respect to the positions of joining portions of images formed by LEDAs.

In FIG. 8, in the LEDA head 11h having the LEDAs 11a arranged in the main-scanning direction, two adjacent LEDAs 11a under consideration have an overlapping joining portion (joint) 11c. Thus, an image of the position detection pattern 14 is formed around the joining portion 11c by those two LEDAs 11a.

The pixel count range of each LEDA 11a is recorded in a recording unit of a driving (lighting) control unit of the LEDA head 11h. Hence, the driving control unit of the LEDA head 11h can form pattern images in such a way that the joining portions 11c of the LEDAs 11a in the LEDA head 11h have a predetermined relationship (described later) with those patterns.

Each position detection pattern 14 is made of three straight lines L1, L2, and L3. Out of those straight lines, two straight lines L1 and L2 extend in the main-scanning direction and are spaced apart at a predetermined distance (in this example, "4a") in the sub-scanning direction in which the corresponding pattern image is carried. The remaining straight line L3 passes through a point C, which corresponds to the joining portion 11c and which is equidistance from the two straight lines L1 and L2. Moreover, the straight line L3 extends at an angle of 45° with respect to the main-scanning direction. (In this example, both sides of the straight line L3 end at the length "a" in the sub-scanning direction from the point C).

The image density detection sensor 30 detects the three straight lines L1, L2, and L3 of the corresponding position detection pattern 14, which is formed and carried on the carrier belt 5 or the intermediate transfer belt 5' in the manner described above.

Returning to the explanation with reference to FIG. 6, the position detecting unit 101 refers to the detection result obtained by the image density detection sensor 30 regarding the position detection pattern 14, and accordingly detects the position in the main-scanning direction of the image density detection sensor 30 with respect to the LEDAs 11a.

Figure 9A:
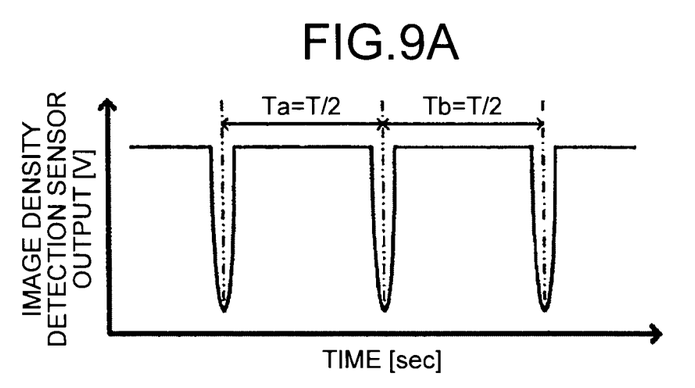
FIGS. 9A to 9C are graphs illustrating the output of an image density detection sensor that detects a position detecting pattern.
Figure 9B:
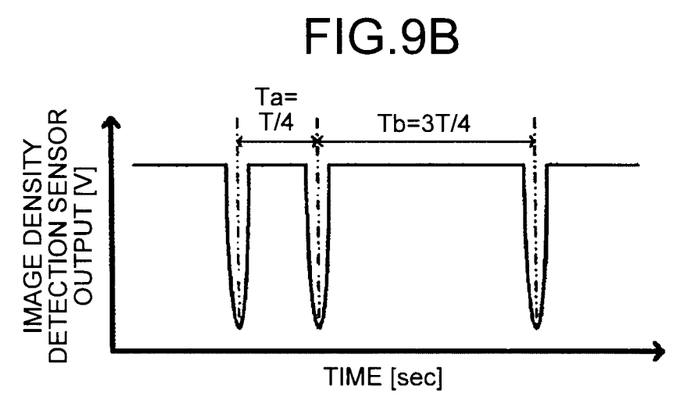
Figure 9C:
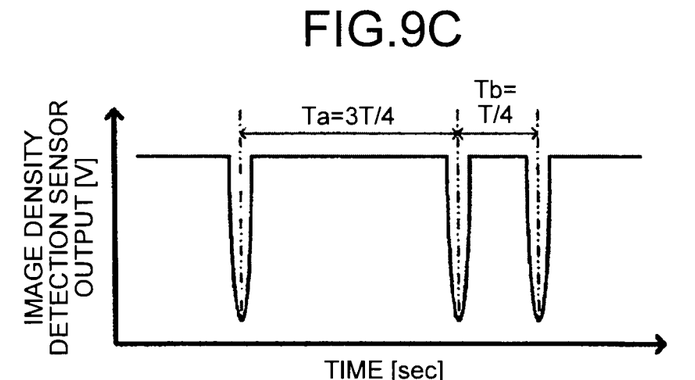

FIGS. 9A to 9C is a set of graphs illustrating the output of the image density detection sensor 30 that detects the position detecting pattern 14 illustrated in FIG. 8. In each graph illustrated in FIGS. 9A to 9C, the vertical axis represents an output signal (V) of the image density detection sensor 30; while the horizontal axis represents the time (sec). Since the carrier belt 5 or the intermediate transfer belt 5', which carries the position detection pattern that has been formed, moves at a certain carrying speed; the time represented on the horizontal axis corresponds to the position of that belt.

The image density detection sensor 30 emits light on the carrier belt 5 or the intermediate transfer belt 5' and receives the reflected light, and outputs the output signal (V) according to the intensity of the reflected light. Herein, the reflected light from the position detection pattern 14 on the carrier belt 5 or the intermediate transfer belt 5' is low in intensity. Thus, when the image density detection sensor 30 detects the three straight lines L1, L2, and L3 of the position detection pattern 14; the output signal output from the image density detection sensor 30 decreases in intensity.

The three straight lines L1, L2, and L3 of the position detection pattern 14 pass over the corresponding image density detection sensor 30, thereby causing changes (decrease) in the intensity of the sensor output signal, at different timings that change in the order in which the three straight lines L1, L2, and L3 reach the corresponding image density detection sensor 30 depending on the carrying direction of the position detection pattern 14. Thus, the output signal undergoes changes for three times.

Of the three changes occurring in the output signal, the timing of a change in the first sensor output signal caused by the passing of the straight line L1 and the timing of a change in the last sensor output signal caused by the passing of the straight line L2 remain unchanged irrespective of the position in the main-scanning direction of the corresponding image density detection sensor 30.

In contrast, the timing of a change in the sensor output signal caused by the passing of the straight line L3 changes according to a change in the position in the main-scanning direction of the corresponding image density detection sensor 30. Thus, by detecting that particular timing, it becomes possible to detect the position in the main-scanning direction of the corresponding image density detection sensor 30.

This situation is explained with reference to the graphs A, B, and C illustrated in FIGS. 9A to 9C.

In the graph A in FIG. 9A, it is illustrated that the sensor output signal undergoes a change at a timing when the image density detection sensor 30 is positioned at that point on the position detection pattern 14 which corresponds to the joining portion 11c of the LEDAs 11a, that is, when the image density detection sensor 30 is positioned at the point C of the straight line L3 of the position detection pattern 14. Thus, the timing of passing of the first straight line L1 and the timing of passing of the last straight line L2 remain unchanged. Consequently, the elapsed time in that period remains unchanged. If that elapsed time is considered to be "T", the timing at which the sensor output signal changes due to the passing of the straight line T3 is "T/2" with respect to an elapsed time Ta since the passing of the first straight line L1 and is "T/2" with respect to an elapsed time Tb until the passing of the last straight line L2.

In the graph B in FIG. 9B, it is illustrated that the sensor output signal undergoes a change at a timing when the image density detection sensor 30 is positioned at that point on the position detection pattern 14 which is spaced apart from the position illustrated in the graph A by the distance "a" in the opposite direction to the main-scanning direction (in this example, positioned at the leading end of the straight line L3). Thus, if the elapsed time in the unchanged period between the timing of passing of the first straight line L1 and the timing of passing of the last straight line L2 is considered to be "T", the timing at which the sensor output signal changes due to the passing of the straight line T3 is "T/4" with respect to the elapsed time Ta since the passing of the first straight line L1 and is "3T/4" with respect to the elapsed time Tb until the passing of the last straight line L2.

In the graph C in FIG. 9C, it is illustrated that the sensor output signal undergoes a change at a timing when the image density detection sensor 30 is positioned at that point on the position detection pattern 14 which is spaced apart from the position illustrated in the graph A by the distance "a" in the main-scanning direction (in this example, positioned at the rear end of the straight line L3). Thus, if the elapsed time in the unchanged period between the timing of passing of the first straight line L1 and the timing of passing of the last straight line L2 is considered to be "T", the timing at which the sensor output signal changes due to the passing of the straight line T3 is "3T/4" with respect to the elapsed time Ta since the passing of the first straight line L1 and is "T/4" with respect to the elapsed time Tb until the passing of the last straight line L2.

As described above, by referring to the timing at which a change occurs in the sensor output signal during the passing of the straight line L3, that is, by referring to the elapsed time Ta; the position detecting unit 101 detects the position of the image density detection sensor 30 in a predetermined range in either the opposite direction or the forward direction of the main-scanning direction with respect to point on the position detection pattern 14 which corresponds to the joining portion 11c of the LEDAs 11a.

Returning to the explanation with reference to FIG. 6, the determining unit 102 refers to the position detected by the position detecting unit 101 and accordingly determines whether or not the image density detection sensor 30 is positioned at a proper detection position with respect to the corresponding position detection pattern 14 on which the noise does not have any effect. More particularly, as a proper detection position, the determining unit 102 considers a position that is spaced apart by a predetermined distance or more from the joining portion (joint) 11c of two LEDAs 11a, and determines whether or not the corresponding image density detection sensor 30 is at that proper detection position.

Thus, in the present embodiment, depending on the detection result of the position detecting unit 101, it is determined whether or not the image density detection sensor 30 is at a proper detection position that is set within a predetermined range not in the vicinity of the corresponding joining portion 11c of the LEDAs 11a. Herein, the position of the joining portion 11c of the LEDAs 11a at which the elapsed time Ta becomes "T/2" is most affected by noise images. However, larger the distance from that position, smaller is the effect of noise images. Thus, a predetermined range on both sides of that position is set as the range that gets affected by noise images.

Thus, while avoiding the range that gets affected by noise images; a proper detection position, at which the image density detection sensor 30 can perform proper detection, is determined to be in a range satisfying one of the following conditions. For example, $$Ta \leq 3T/8, 5T/8 \leq T$$

Since such a range of proper detection positions is an amount related to device-specific features, it can be determined by using empirical values obtained to confirm the range of performing proper image density detection.

In this way, the determining unit 102 determines whether or not the elapsed time Ta, which is obtained by the image density detection sensor 30 by detecting the corresponding position detection pattern 14, is within a predetermined range of proper detection positions.

Returning to the explanation with reference to FIG. 6, when the determining unit 102 determines that the image density detection sensors 30 are positioned at proper detection positions, the operation control unit 103 makes use of the image density detection sensors 30 to perform the image density detection operation with respect to dither pattern images.

More particularly, from among the plurality of image density detection sensors 30, the operation control unit 103 selects one or more of the image density detection sensors 30 that are determined to be positioned at proper detection positions and performs the image density detection operation with respect to dither pattern images by making use of the selected image density detection sensors 30.

Moreover, when a particular image density detection sensor 30 is determined not to be at a proper detection position, the operation control unit 103 controls the movement mechanism 20 to move that image density detection sensor 30 to a proper detection position.

The correcting unit 104 performs skew correction of images, which are formed by the image forming units 6BK, 6M, 6C, and 6Y, by shifting the images in the sub-scanning direction so as to negate the skew (tilt) of the images. At that time, the correcting unit 104 shifts the images while excluding the images positioned corresponding to the positions of the image density detection sensors 30.

Figure 10:
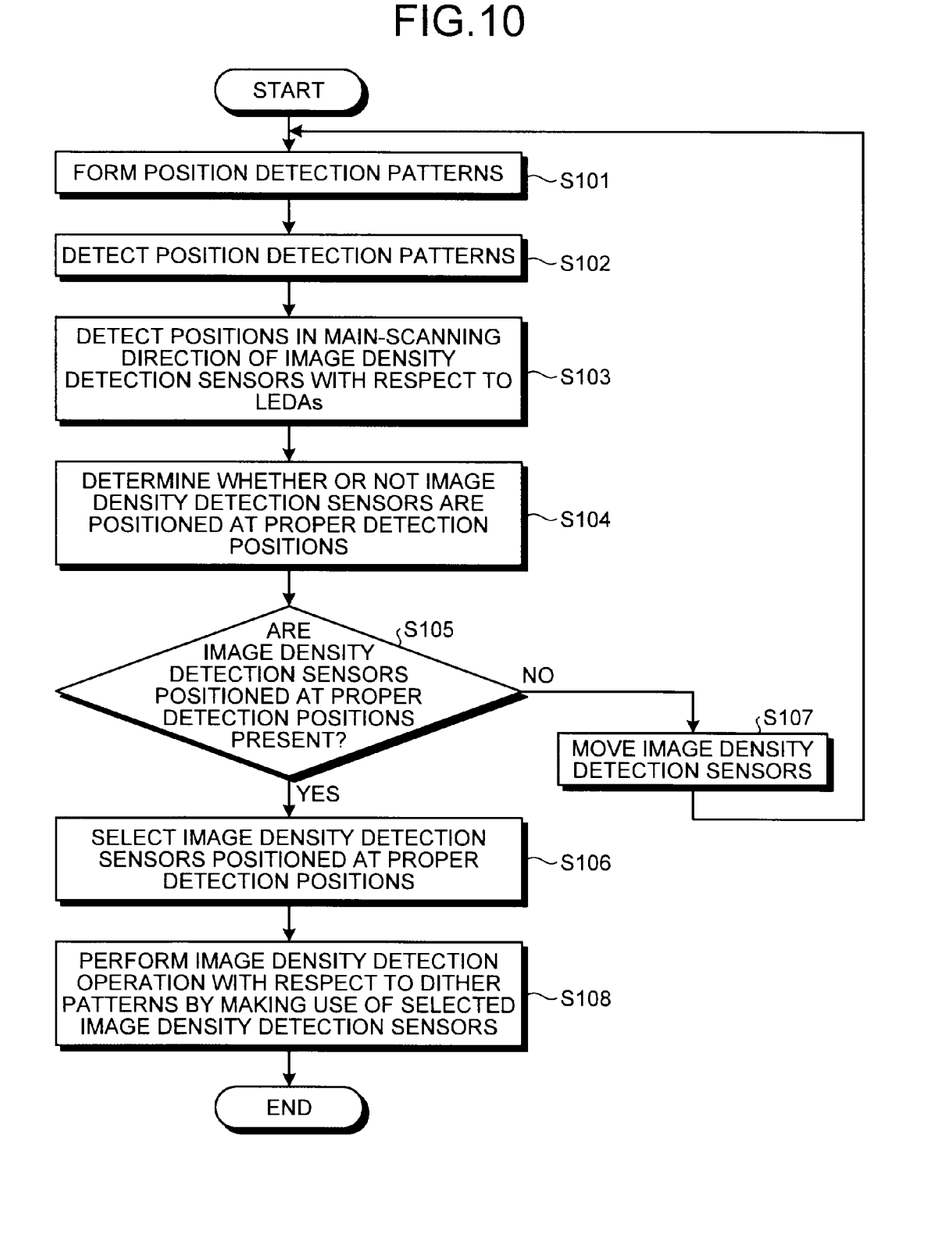
FIG. 10 is a flowchart for explaining a sequence followed in an image density detection operation with respect to dither pattern images.

Given below is the explanation regarding the image density detection operation performed with respect to dither pattern images by the image forming apparatus that is configured in the abovementioned manner according to the present embodiment. FIG. 10 is a flowchart for explaining a sequence followed in the image density detection operation with respect to dither pattern images.

The image density detection operation as illustrated in the flowchart in FIG. 10 is performed by the control unit 100 as a separate operation from the normal print output operation of transferring images on paper sheets and outputting the paper sheets. Moreover, the image density detection operation is performed by the control unit 100 either at a timing when the user or the device administrator determines that it is necessary to perform the operation and issues an execution instruction, or at a timing when the image forming apparatus itself determines, for example, a temporal change or a temperature change that may lead to a shift from the required image densities.

During the image density detection operation, firstly, according to the instruction from the control unit 100, the image forming units 6BK, 6M, 6C, and 6Y form the position detection patterns 14, which are used in detecting the positional relationship between the LEDAs 11a constituting the LEDA head 11h and the image density detection sensors 30, on the carrier belt 5 or the intermediate transfer belt 5' (Step S101).

Then, the position detection patterns 14 formed at Step S101 are detected by the image density detection sensors 30 (Step S102). Subsequently, as explained above with reference to FIGS. 8 and 9, based on the detection result regarding the position detection patterns 14, the position detecting unit 101 detects the positions in the main-scanning direction of the image density detection sensors 30 with respect to the LEDAs 11a in the form of time signals Ta represented by the relationships with the joining portions 11c of the LEDAs 11a (Step S103).

Then, the determining unit 102 determines whether or not the positions, which are represented as the time signals Ta, in the main-scanning direction of the image density detection sensors 30 are proper detection positions (Step S104).

More particularly, at Step S104, as described above, it is confirmed whether or not proper detection is possible while avoiding detection of noise images.

Then, the determining unit 102 determines whether or not the image density detection sensors 30 positioned at proper detection positions are present (Step S105). If no image density detection sensor 30 positioned at a proper detection position is present (No at Step S105), then the operation control unit 103 instructs the movement mechanism 20 to move the image density detection sensors 30 in the main-scanning direction to proper detection positions (Step S107). The movement distance is a distance estimated from the length in the main-scanning direction of the LEDAs 11a. Then, the system control returns to Step S101 and the operations are repeated starting from the formation of the position detection patterns 14.

Meanwhile, when the image density detection sensors 30 positioned at proper detection positions are present (Yes at Step S105), the operation control unit 103 selects one or more of the image density detection sensors 30 that are positioned at proper detection positions (Step S106) and performs the image density detection operation with respect to dither pattern images by making use of the selected image density detection sensors 30 (Step S108). That marks the end of the image density detection operation.

At the operation performed at Step S108, the image forming units 6BK, 6M, 6C, and 6Y form the dither patterns to be subjected to image density detection on the carrier belt 5 or the intermediate transfer belt 5', and the image density detection sensors 30 detect the image densities of the dither patterns.

At Step S106, in the configuration illustrated in FIG. 3C in which a plurality of the image density detection sensors 30 are disposed, when more than one image density detection sensor 30 are confirmed to be at proper detection positions, selecting the image density detection sensor 30 which are not much affected by noise images serves the original purpose. In that regard, based on the time signals Ta obtained at the time of determining whether or not the image density detection sensors 30 are at proper detection positions, the operation control unit 103 can be configured to select the most suitable image density detection sensor 30 that is not easily affected by noise images. That enables achieving optimization of the image density detection operation. The most suitable image density detection sensor 30 can be selected by, for example, selecting the image density detection sensor 30 for which |Ta−T| is the greatest.

Meanwhile, in the configuration illustrated in FIG. 3C in which a plurality of the image density detection sensors 30 are disposed, it is highly likely that one of the image density detection sensors 30 is at a proper detection position. Hence, on the assumption that the image density detection operation with respect to dither patterns is performed instantly; if the position detection patterns 14 and the dither patterns to be subjected to image density detection are formed in succession, the processing time can be reduced.

The following explanation is given for a measure that makes the operations in the present embodiment effective while not getting affected by skew correction.

Figure 11:
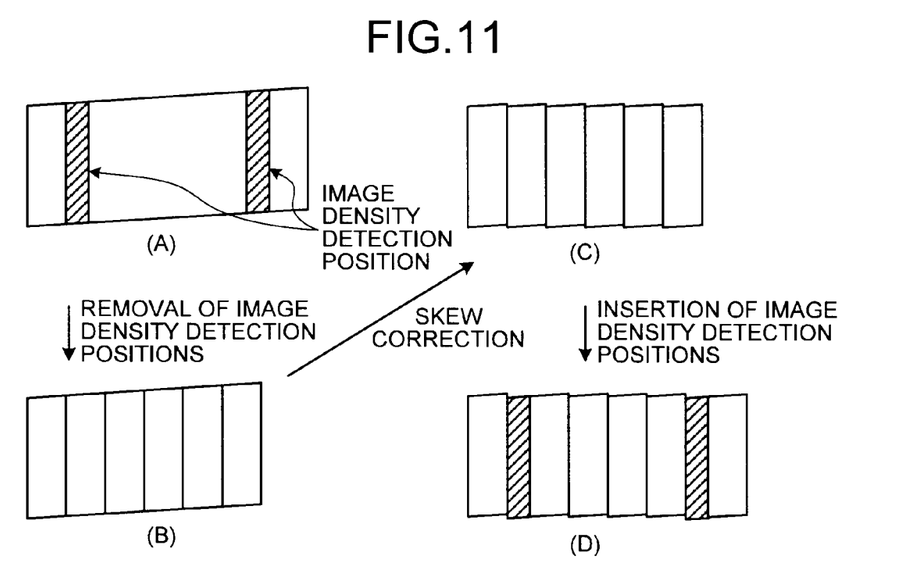
FIG. 11 is an explanatory diagram for explaining skew correction that is performed by taking into account the adjustment for image density detection according to the embodiment.

As far as the known skew correction is concerned, when the proper orthogonal relationship between the LEDA head, which is oriented in the main-scanning direction, and the carrier belt 5 or the intermediate transfer belt 5', which moves in the sub-scanning direction, gets disrupted thereby resulting in a tilt; for every predetermined main-scanning range, the print output image is shifted by a single line in the sub-scanning direction with the aim of eliminating the tilt at the belt on which the image is formed (see explanation regarding (B) and (C) with reference to FIG. 11).

While performing skew correction, since the image being formed is moved by a single line in the sub-scanning direction, there occurs a phenomenon identical to misalignment in the joining portions (joints) of the adjacent LEDAs 11a, thereby leading to the formation of stripe-shaped noise images.

In that regard, in the present embodiment, while performing skew correction, the correcting unit 104 excludes the images within the detection ranges of the image density detection sensors 30 so that the noise images formed due to skew correction do not get mixed with normal images.

In order to implement this method, it is necessary to know the positions in the main-scanning direction of the image density detection sensors 30. Those positions are obtained while measuring the tilt (skew amount) that is required in skew correction. That is because the tilt (skew amount) required in skew correction can be obtained using the image density detection sensors 30. As described above with reference to FIG. 3B, the image density detection sensors 30 double up as the sensors for detecting the skew amount. At that time, the positions in the main-scanning direction of the image density detection sensors 30 is automatically known.

FIG. 11 is an explanatory diagram for explaining skew correction that is performed by taking into account the adjustment for image density detection according to the present embodiment.

In FIG. 11, the image processing performed during skew correction while excluding the images within the detection ranges of the image density detection sensors 30 is illustrated in the order of (A), (B), (C), and (D). Herein, prior to performing the image processing, it is assumed that the tilt required in skew correction has already been obtained.

Firstly, at (A) in FIG. 11, of the original image to be subjected to processing for image formation, the image portions corresponding to image density detection positions (in (A) in FIG. 11, hatched portions) are determined. Such image portions are determined based on the positions in the main-scanning direction of the image density detection sensors 30 that are already known from the time of obtaining the tilt required for skew correction.

Subsequently, at (B) in FIG. 11, the image portions determined in (A) described above are removed from the original image. Thus, in (B) in FIG. 11 is illustrated the image after performing the removal operation.

Then, at (C) in FIG. 11, skew correction is performed with respect to the image (at (B)) from which the image portions corresponding to image density detection positions are removed. During skew correction, for every main-scanning range determined based on the amount of tilt that is already obtained, the image is shifted by a single line in the sub-scanning direction. In (C) in FIG. 11 is illustrated the post-skew-correction image. In this example, the skew is corrected by means of a decrease toward the right side in entirety.

Then, at (D) in FIG. 11, the image portions that correspond to the image density detection positions and that were removed at (A) and (B) described above are again inserted in the post-skew-correction image (obtained at (C)). The image portions need to be inserted at their original positions in the image. Thus, the processing partitions of the skew correction are not necessarily stored. In (D) in FIG. 11 is illustrated the post-insertion image.

According to the conventional technology, image data used in image formation is always subjected to skew correction. Thus, even while performing the image density detection operation with respect to dither patters, skew correction is carried out. Hence, even if the effect of noise images that are formed due to misalignment in LEDAs is avoided as described in the embodiments above, noise images formed due to skew correction affect the images. In contrast, as described above, if the images within the detection ranges of the image density detection sensors are excluded from skew correction, the noise images formed due to skew correction can be prevented from getting mixed with normal images.

As a result, it becomes possible to effectively avoid the effect of noise images that are formed due to misalignment in LEDAs.

Meanwhile, the control unit 100 of the image forming apparatus can be configured using a computer. As a hardware configuration, the computer includes a central processing unit (CPU), a memory such as a random access memory (RAM) or a read only memory (ROM), and a hard disk drive.

In order to make the computer function as the control unit 100, relevant computer programs are recorded in the ROM or the hard disk drive. The CPU uses the RAM as the work area and runs the computer programs so that the control unit having the intended functions can be configured.

Moreover, as a medium (computer program product) for recording the computer programs that are required to configure the control unit 100, not only the ROM and the hard disk drive can be used but also various types of memory media such as a compact disk read only memory (CD-ROM) or a magneto-optical disk (MO) can be used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that performs pseudo gradation processing by implementing dithering, the image forming apparatus comprising:
   an image carrier;
   a plurality of light-emitting element arrays that are arranged in a main-scanning direction and that include a plurality of light-emitting elements;
   an image forming unit that performs lighting control of the plurality of light-emitting element arrays and forms a pattern image on the image carrier;
   a detecting unit that detects a density of the pattern image formed on the image carrier;
   a position detecting unit that detects a position in the main-scanning direction of the detecting unit with respect to the light-emitting element arrays;
   a determining unit that, based on the detected position, determines whether or not the detecting unit is positioned at a proper detection position with respect to the pattern image on which a noise has no effect; and an operation control unit that, when it is determined that the detecting unit is positioned at the proper detection position, makes use of the detecting unit to perform an image density detection operation with respect to the pattern image.

2. The image forming apparatus according to claim 1, wherein the detecting unit is disposed in plurality, and the operation control unit selects one or more detecting units that are determined to be positioned at the proper detection positions and performs the image density detection operation with respect to the pattern image by making use of the selected detecting units.

3. The image forming apparatus according to claim 2, wherein, when a plurality of detecting units are determined to be positioned at the proper detection positions, the operation control unit selects the most suitable detecting unit and performs the image density detection operation with respect to the pattern image by making use of the selected detecting unit.

4. The image forming apparatus according to claim 1, further comprising a moving unit that moves the detecting unit in the main-scanning direction, wherein when the detecting unit is determined not to be positioned at the proper detection position, the operation control unit controls the moving unit to move the detecting unit to the proper detection position.

5. The image forming apparatus according to claim 1, wherein on the image carrier, the image forming unit additionally forms a position detection pattern that is used in detecting the position in the main-scanning direction of the detecting unit with respect to the light-emitting element arrays, the detecting unit detects the position detection pattern formed on the image carrier, and based on a detection result regarding the position detection pattern, the position detecting unit detects the position in the main-scanning direction of the detecting unit with respect to the light-emitting element arrays.

6. The image forming apparatus according to claim 1, wherein the determining unit determines a position that is spaced apart by a predetermined distance or more from joining portions of the plurality of light-emitting element arrays as the proper detection position and then determines whether or not the detecting unit is positioned at the proper detection position.

7. The image forming apparatus according to claim 1, further comprising a correcting unit that, at a time of correcting a tilt in an image, which is formed by the image forming unit, by shifting the image in a sub-scanning direction so as to negate the tilt of the image, shifts the image while excluding an image portion positioned corresponding to the detecting unit.

8. An image density detecting method implemented in an image forming apparatus that performs pseudo gradation processing by implementing dithering, the image density detecting method comprising:

forming that includes performing lighting control of a plurality of light-emitting element arrays that are arranged in a main-scanning direction and forming a pattern image on an image carrier;

detecting, by a detecting unit, a density of the pattern image formed on the image carrier;

position-detecting that includes detecting a position in the main-scanning direction of the detecting unit with respect to the light-emitting element arrays;

determining, based on the detected position, whether or not the detecting unit is positioned at a proper detection position with respect to the pattern image on which a noise has no effect; and performing, when it is determined that the detecting unit is positioned at the proper detection position, an image density detection operation with respect to the pattern image by making use of the detecting unit.

9. A computer program product comprising a non-transitory computer-usable medium having computer-readable program codes embodied in the medium for forming an image in an image forming apparatus that performs pseudo gradation processing by implementing dithering, the program codes when executed causing a computer to execute:

forming that includes performing lighting control of a plurality of light-emitting element arrays that are arranged in a main-scanning direction and forming a pattern image on an image carrier;

detecting, by a detecting unit, a density of the pattern image formed on the image carrier;

position-detecting that includes detecting a position in the main-scanning direction of the detecting unit with respect to the light-emitting element arrays;

determining, based on the detected position, whether or not the detecting unit is positioned at a proper detection position with respect to the pattern image on which a noise has no effect; and performing, when it is determined that the detecting unit is positioned at the proper detection position, an image density detection operation with respect to the pattern image by making use of the detecting unit.

* * * * *